US012643659B2

(12) United States Patent
Padalecki et al.

(10) Patent No.: US 12,643,659 B2
(45) Date of Patent: Jun. 2, 2026

(54) ANTI-RATTLE DEVICE FOR USE ON CARGO AIRCRAFT

(71) Applicant: KNIGHT AEROSPACE, San Antonio, TX (US)

(72) Inventors: August Padalecki, San Antonio, TX (US); Michael Huizar, San Antonio, TX (US); Tye Thompson, San Antonio, TX (US); David Light, San Antonio, TX (US); Luke Perkins, San Antonio, TX (US)

(73) Assignee: KNIGHT AEROSPACE, San Antonio, TX (US)

( * ) Notice: Subject to any disclaimer, the term of this patent is extended or adjusted under 35 U.S.C. 154(b) by 540 days.

(21) Appl. No.: 18/341,698

(22) Filed: Jun. 26, 2023

(65) Prior Publication Data

US 2023/0415893 A1 Dec. 28, 2023

Related U.S. Application Data

(60) Provisional application No. 63/355,423, filed on Jun. 24, 2022.

(51) Int. Cl.
B64D 9/00 (2006.01)
B60P 7/06 (2006.01)

(52) U.S. Cl.
CPC .............. B64D 9/003 (2013.01); B60P 7/06 (2013.01)

(58) Field of Classification Search
CPC .... B64D 9/003; B64D 9/00; B64D 2009/006; B64D 11/0696; B64C 1/20; B60P 7/13; B60P 7/0807; B60P 7/0815; B60P 7/08; B60P 7/06; B60P 7/135; B60P 7/0892

USPC ...................................... 410/79; 244/122 AG
See application file for complete search history.

(56) References Cited

U.S. PATENT DOCUMENTS

| | | | |
|---|---|---|---|
| 3,664,464 | A | 5/1972 | Southard |
| 5,131,606 | A | 7/1992 | Nordstrom |
| 5,915,900 | A | 6/1999 | Boltz |
| 8,376,306 | B2 | 2/2013 | Dowty |
| 9,291,234 | B1 | 3/2016 | Green et al. |

(Continued)

FOREIGN PATENT DOCUMENTS

| | | |
|---|---|---|
| DE | 102013018623 A1 | 5/2015 |
| ES | 2788133 T3 | 10/2020 |

OTHER PUBLICATIONS

PCT/US2023/026266 International Search Report and Written Opinion dated Oct. 6, 2023, 18 pgs.

*Primary Examiner* — Amy R Weisberg
*Assistant Examiner* — Philip Charles Adams
(74) *Attorney, Agent, or Firm* — Myers Wolin, LLC

(57) ABSTRACT

Embodiments are directed to an anti-rattle device, including a plurality of handle bracket assemblies, and a wedge assembly. Each of the handle bracket assemblies includes an adjustable handle, a bracket, and a threaded rod. The wedge assembly includes a frame and a rubber wedge. Each of the handle bracket assemblies is secured to a pallet. The adjustable handle of each of the handle bracket assemblies is configured to actuate to move the wedge assembly in a downward direction to engage a rail of a cargo handling system, such that the engagement of the wedge assembly against the rail creates tension and frictional force between the pallet and the cargo handling system to further secure the pallet in place.

17 Claims, 11 Drawing Sheets

(56) References Cited

U.S. PATENT DOCUMENTS

| | | | |
|---|---|---|---|
| 10,919,433 B1 | 2/2021 | Lee et al. | |
| 11,554,724 B2 | 1/2023 | Owen et al. | |
| 2012/0039684 A1 | 2/2012 | Baker | |
| 2012/0273635 A1* | 11/2012 | Byler | B64D 9/003 |
| | | | 248/205.5 |
| 2013/0334367 A1* | 12/2013 | Larson | B60P 7/08 |
| | | | 244/118.1 |
| 2020/0216175 A1 | 7/2020 | De Melo et al. | |

* cited by examiner

FIG. 11A                    FIG. 11B

ANTI-RATTLE DEVICE FOR USE ON CARGO AIRCRAFT

CROSS REFERENCE TO RELATED APPLICATION

This application is related to, and claims priority to, U.S. Provisional Patent Application Ser. No. 63/355,423, filed on Jun. 24, 2022, the entire disclosure of which is incorporated by reference herein.

TECHNICAL FIELD

Embodiments generally relate to a pallet restraint device for securing a pallet to a cargo handling system in an aircraft. More particularly, various embodiments are directed to an antirattle device for securing the pallet to rails of the cargo handling system in the aircraft, thereby minimizing movement of the pallet in the aircraft during flight.

BACKGROUND

Commercial and military transport aircraft are typically designed to carry a given load of cargo, passengers, or a combination thereof (hereinafter referred to as "cargo"). The aircraft employs a cargo handling system to quickly and efficiently load, unload, and secure the cargo within the aircraft. Cargo may be transported on one or more pallets, such as an HCU-6/E or an 463L Master Pallet, or other standardized pallet for transporting military air cargo.

The cargo handling system is a series of rollers, rails, and locks that guide the cargo pallet into the aircraft and restrain the pallet from moving in the aircraft during transport. The cargo handling system consists of rollers, which allow the pallet to roll forward and aft into a desired position in the aircraft, rails, which align the orientation of the pallet in relation to an adjacent pallet and constrain the pallet to only move in a linear direction forward and aft in the aircraft, and locks, which engage and secure the pallet in place on the aircraft.

Cargo handling systems engage a locking mechanism or pallet restraint device, which may either be attached directly to the pallet or in most cases a separate, stand-alone locking mechanism, to secure the pallet to the adjacent pallet or to the rails of the cargo handling system.

Conventional pallet restraint devices are designed with wide tolerances, allowing small amounts of movement (i.e., "slack") of the cargo or palletized system, even when the cargo handling system locks are engaged. Movement of the pallets may be caused by turbulence during take-off, flight, or landing of the aircraft (i.e., "jolting").

In the context of palletized systems, "slack" refers to excessive looseness or play in the locking mechanisms that secure the pallets in place. It implies a degree of movement or free space within the locking system, which can result in instability or shifting of the pallets during transportation or handling. "Jolting" refers to sudden and abrupt movements or shocks experienced by the pallets, or the items placed on them. It can occur due to various factors, such as uneven surfaces, sudden stops or accelerations, or inadequate shock absorption. Jolting can lead to potential damage or displacement of the cargo, compromising the safety and integrity of the transported goods. Current conventional palletized systems have a measurable tolerance of around 0.500 inches between the lug and locking system. This tolerance allows for some vibration along the pallet. For certain applications, such as seating pallets and palletized lavatory/galleys, its preferred to have a limited amount of vibration due to in-flight operations, particularly for the comfort and convenience of use by personnel on the aircraft.

The "play" between the lugs and the mechanical lip on conventional locking systems typically have a 0.500-inch tolerance. It should be noted that "up and down" movement as well as "forward and aft" movement may be experienced in conventional pallet restraint devices.

Conventional anti-rattle devices have been developed to address the issues encountered by conventional pallet restraint devices. These conventional anti-rattle devices require separate, stand-alone equipment, extensive manual setup, and often the presence of multiple aligned pallets.

One conventional anti-rattle device, as shown in FIG. 1, incorporates a plurality of rubber stops providing compression using a threaded screw to wedge a pallet up against another pallet in a longitudinal direction, compressing the pallet lugs onto the aircraft's lock. This device requires the presence of multiple pallets, and therefore is not a solution when only one pallet is present.

Another conventional anti-rattle device, as shown in FIGS. 2A and 2B, is designed for modules consisting of a sheet metal weldment with a poly bushing and threaded screw attached to a plate. As the module in the aircraft moves forward and aft in a longitudinal direction, the module compresses the poly pushing. This conventional device may also be secured by attaching the device to an aircraft's D-ring. This device requires extensive manual setup and includes stand-alone equipment, which may be misplaced and thus inoperable if any of the stand-alone equipment is misplaced.

Other conventional anti-rattle devices are equipped with a mechanical lip on either side of the pallet, which interface with the rails of the cargo handling system on either side of the aircraft. These conventional devices keep the palletized system rolling in a linear fashion from forward to aft or vice versa within the aircraft. Additionally, these conventional anti-rattle pallet restraint devices include multiple recesses within the mechanical lip, providing a space for locks to come out from the sides of the aircraft and provide a secondary forward/aft restraint. These devices, however, experience significant "slack" from the "jolting" movement of the aircraft, and thus do not adequately secure the pallet to the cargo handling system.

Thus, it would be desirable to provide an anti-rattle pallet restraint device for securing a pallet to rails of a cargo handling system in the aircraft, which is secured directly to the pallet, thereby eliminating the need for separate equipment, which eliminates the need for the presence of an adjacent pallet to secure the pallet, and which minimizes the "slack" from the "jolting" movement of the aircraft experienced by conventional locking mechanisms.

SUMMARY

Embodiments are directed to an anti-rattle device, including a plurality of handle bracket assemblies and a wedge assembly. Each of the handle bracket assemblies includes an adjustable handle, a bracket, and a threaded rod. The wedge assembly includes a frame and a rubber wedge. Each of the handle bracket assemblies is secured to a pallet. The adjustable handle of each of the handle bracket assemblies is configured to actuate to move the wedge assembly in a downward direction to engage a rail of a cargo handling system, such that the engagement of the wedge assembly against the rail creates tension and frictional force between the pallet and the cargo handling system to secure the pallet in place.

In accordance with at least one embodiment, the plurality of handle bracket assemblies is two handle bracket assemblies.

In accordance with at least one embodiment, the adjustable handle includes a threaded hole configured to receive the threaded rod.

In accordance with at least one embodiment, the adjustable handle is configured to actuate the threaded rod in an upward direction to move the wedge assembly in a non-engaged orientation adjacent to the bracket and in a downward direction to move the wedge assembly in an engaged orientation to engage the rail of a cargo handling system.

In accordance with at least one embodiment, the bracket includes a plurality of apertures, two of which are configured to secure the bracket to a lateral side of the pallet, the two apertures being aligned with pre-drilled holes in the pallet.

In accordance with at least one embodiment, the threaded rod includes a head and a bushing, both of which are configured to engage the wedge assembly.

In accordance with at least one embodiment, the head of the threaded rod is configured to slidingly engage a recess in the rubber wedge of the wedge assembly and an inside surface of the frame of the wedge assembly.

In accordance with at least one embodiment, the bushing of the threaded rod is configured to slidingly engage an outside surface of the frame of the wedge assembly.

In accordance with at least one embodiment, the rubber wedge is nested in an inner surface of the frame of the wedge assembly.

In accordance with at least one embodiment, the rubber wedge is a 75 Durometer rubber wedge capable of securing a pallet load of at least 4,000 lbs or resisting forward or aft load factors of at least 1G on the pallet, when the wedge assembly is engaged with the rail of the cargo handling system.

In accordance with at least one embodiment, the frame and the rubber wedge each includes a plurality of apertures to receive screws to secure the frame and the rubber wedge to one another.

In accordance with at least the one embodiment, the anti-rattle device further includes a tape on an outer surface of the frame of the wedge assembly, wherein the tape is configured to prevent scratching of the pallet by the wedge assembly, when moving the wedge assembly in a downward direction to engage and in an upward direction to disengage the anti-rattle pallet restraint device against the rails of the cargo handling system.

In accordance with at least the one embodiment, the rubber wedge includes a pair of notches, each notch configured to receive the head of the threaded rod for each handle bracket assembly.

In accordance with another embodiment, there is provided a pallet oriented on an aircraft. The pallet includes a pair of anti-rattle devices arranged on each lateral side of the pallet. Each anti-rattle device includes a plurality of handle bracket assemblies and a wedge assembly. Each of the handle bracket assemblies includes an adjustable handle, a bracket, and a threaded rod. The wedge assembly includes a frame and a rubber wedge. Each of the handle bracket assemblies is secured to the pallet. The adjustable handle of each of the handle bracket assemblies is configured to actuate to move the wedge assembly in a downward direction to engage rails of a cargo handling system, such that the engagement creates tension and frictional force between the pallet and the cargo handling system to further secure the pallet in place.

In accordance with at least the one embodiment, a cumulative length of the rubber wedges engaged with the rails of the cargo handling system is 80.00 inches.

In accordance with at least the one embodiment, each of the rubber wedges is a 75 Durometer rubber wedge, the cumulative length of the engaged rubber wedges being capable of securing a pallet load of at least 4,000 lbs or resisting forward or aft load factors of at least 1G on the pallet.

Embodiments are further directed to a method for securing a pallet to a cargo handling system. The method includes the steps of aligning a pallet between rails of a cargo handling system and actuating a pallet restraint device to secure the pallet against the rails of the cargo handling system. The pallet restraint device includes a plurality of handle bracket assemblies and a wedge assembly. Each of the handle bracket assemblies includes an adjustable handle, a bracket, and a threaded rod. The wedge assembly includes a frame and a rubber wedge. Each of the handle bracket assemblies is secured to a pallet. The step of actuating the pallet restraint device includes rotating the adjustable handle of each of the handle bracket assemblies to move the wedge assembly in a downward direction to engage the rails of the cargo handling system, such that the engagement of the wedge assembly against the rails creates tension and frictional force between the pallet and the cargo handling system to secure the pallet in place.

BRIEF DESCRIPTION OF DRAWINGS

The embodiments disclosed here will be understood by the following detailed description, along with the accompanying drawings. The embodiments shown in the figures only illustrate several embodiments of the disclosure. The disclosure admits of other embodiments not shown in the figures and is not limited to the content of the illustrations.

FIG. 11A is a cross sectional view taken along A-A of the wedge assembly of the anti-rattle device shown in FIG. 10, in accordance with an embodiment.

FIG. 11B is a side perspective view of the wedge assembly of the anti-rattle device shown in FIG. 10, in accordance with an embodiment.

DETAILED DESCRIPTION

Figure 1:
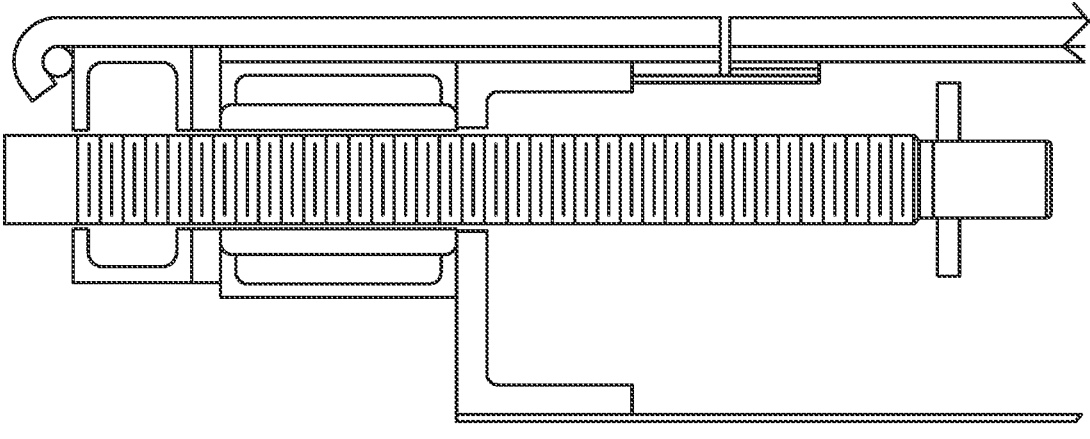
FIGS. 1, 2A, and 2B are perspective views of conventional anti-rattle devices.
Figure 2A:
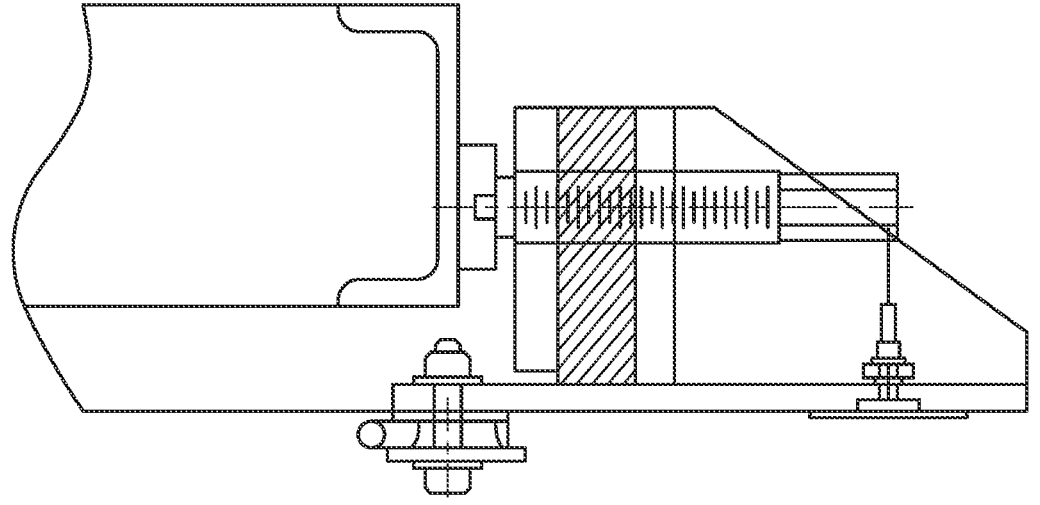
Figure 2B:
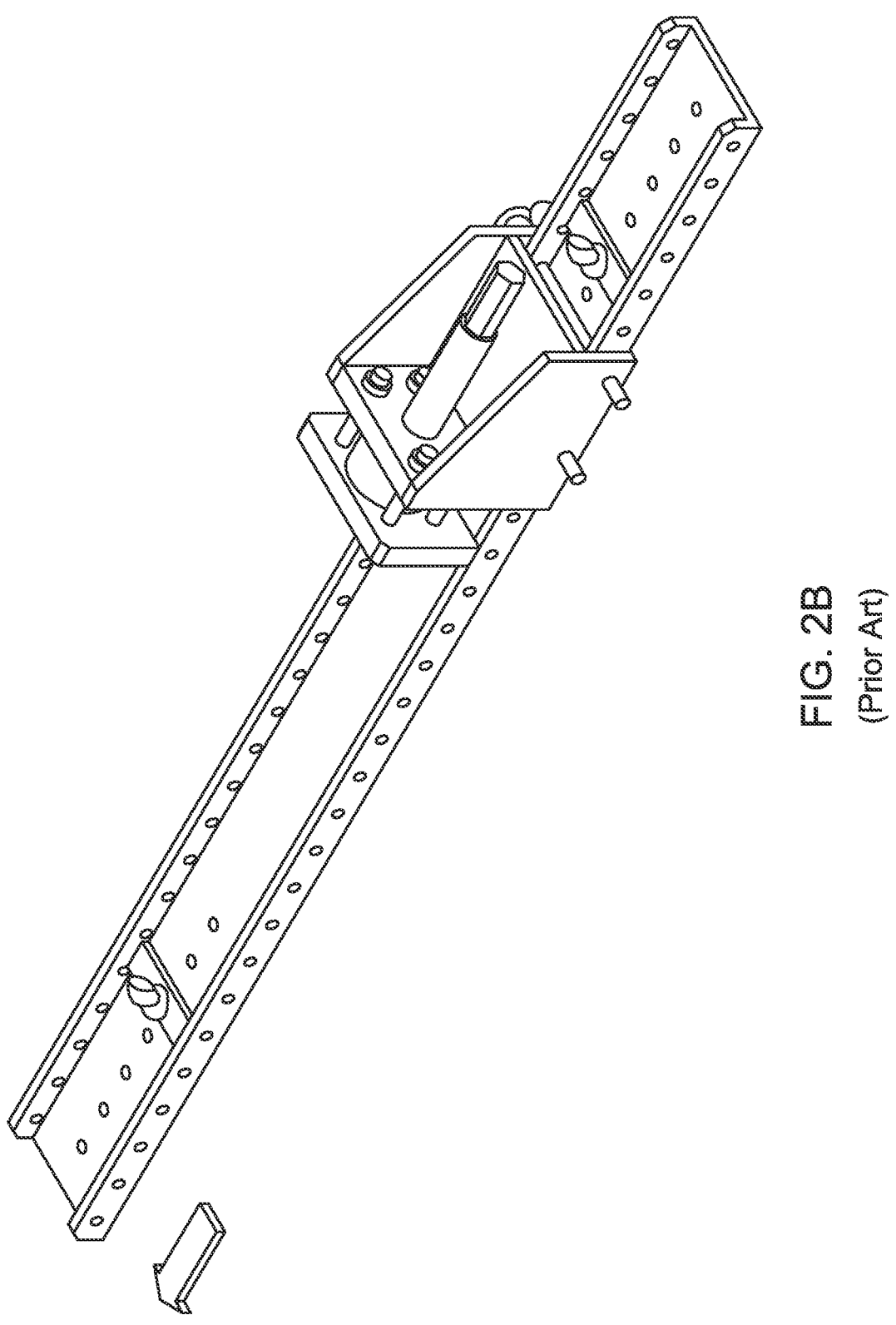

For certain embodiments, many details are provided for a thorough understanding of the various components or steps. In other instances, well-known processes, devices, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes should not be taken in a limiting sense. This disclosure is intended to disclose certain embodiments with the understanding that many other undisclosed changes and modifications can fall within the spirit and scope of the disclosure. The patentable scope is defined by the claims and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," "in at least one embodiment," or "in embodiments," which can each refer to one or more of the same or different embodiments. Furthermore, the terms "comprising," "including," "having," and the like, and all grammatical variations thereof, as used with respect to embodiments of the present disclosure, are synonymous and are each intended to have an open, non-limiting meaning that does not exclude additional elements or steps. The present invention may suitably comprise, consist or consist essentially of the elements disclosed and may be practiced in the absence of an element not disclosed. For example, it can be recognized by those skilled in the art that certain structural elements can be combined into a single structural element.

The singular forms "a," "an," and "the" include plural referents, unless the context clearly dictates otherwise.

All numbers expressing quantities, percentages or proportions, and other numerical values used in the specification and claims are to be understood as being modified in all instances by the term "about" unless otherwise indicated. The term "about" applies to all numeric values, whether or not explicitly indicated. Values modified by the term "about" can include a deviation of at least ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit, as well as the upper limit and the lower limit; and includes lesser ranges of the interval subject to any specific exclusion provided.

Unless otherwise defined, all technical and scientific terms used in this specification and the appended claims have the same meanings as commonly understood by one of ordinary skill in the relevant art.

Where a method comprising two or more defined steps is recited or referenced in this disclosure or the appended claims, the defined steps can be carried out in any order or simultaneously except where the context excludes that possibility.

Embodiments of the anti-rattle device, as described in detail below, minimize the vibratory effects of a pallet system caused by turbulence during transport of the pallet system on an aircraft. In some applications where the pallet serves as a base for personnel seating or operator cargo on the aircraft, the anti-rattle device, according to various embodiments, minimizes "jolting" to personnel seating and operator cargo, improving the experience and comfort of passengers and operators on the aircraft.

Figures 3, 4:
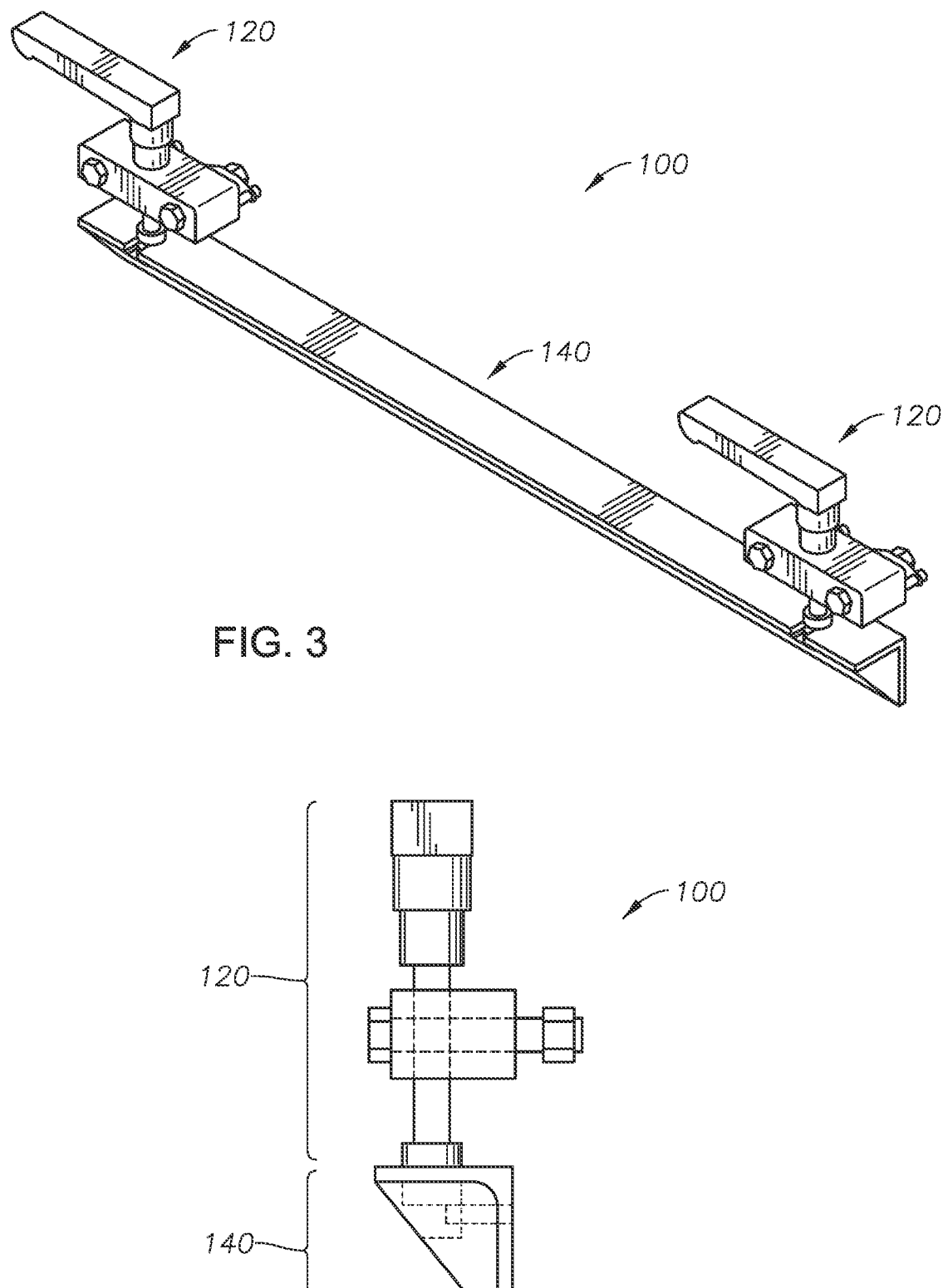
FIG. 3 is a perspective view of an anti-rattle device, in accordance with an embodiment.
FIG. 4 is a side perspective view of the anti-rattle device shown in FIG. 3, in accordance with an embodiment.
Figure 5:
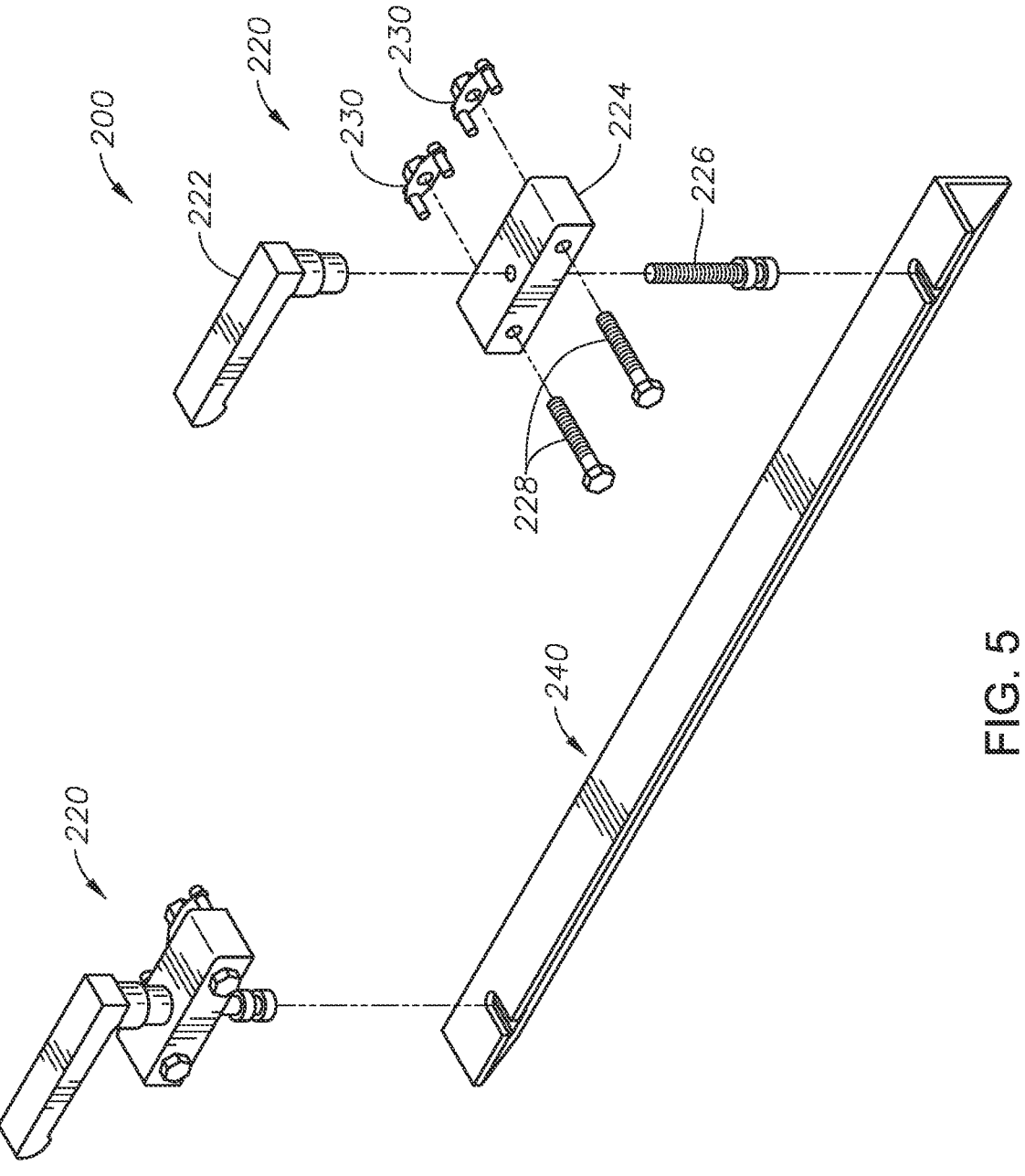
FIG. 5 is an exploded perspective view of the anti-rattle device shown in FIG. 3, in accordance with an embodiment.
Figure 6:
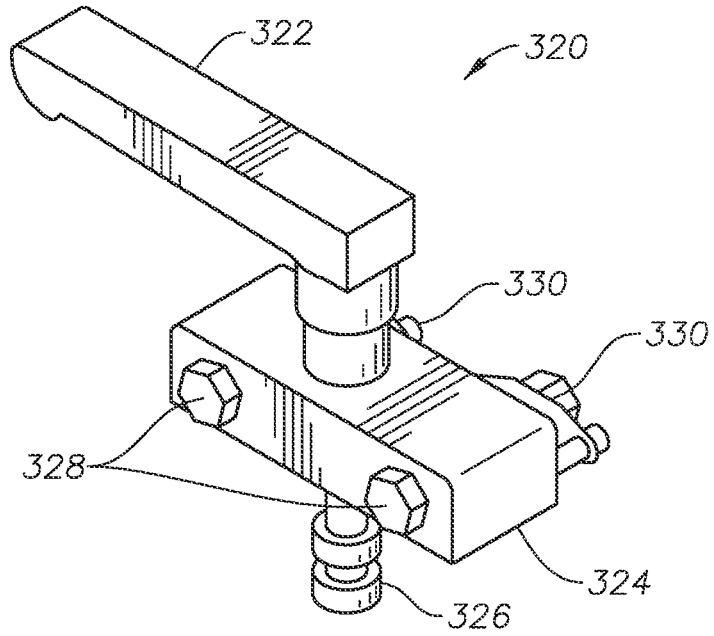
FIG. 6 is a perspective view of a handle assembly of the anti-rattle device shown in FIG. 3, in accordance with an embodiment.
Figure 7:
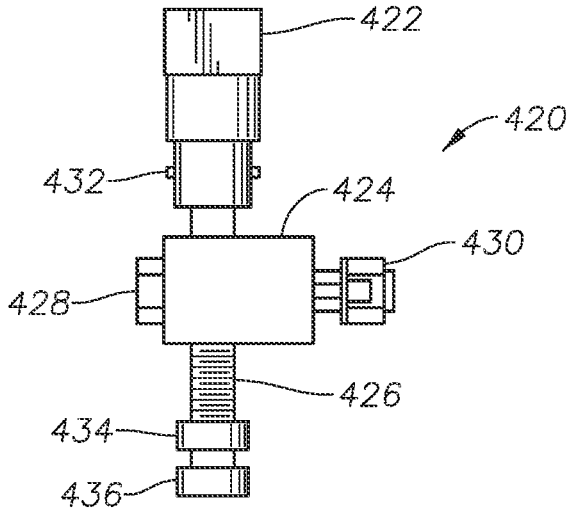
FIG. 7 is a side perspective view of the handle assembly shown in FIG. 6, in accordance with an embodiment.
Figure 8:
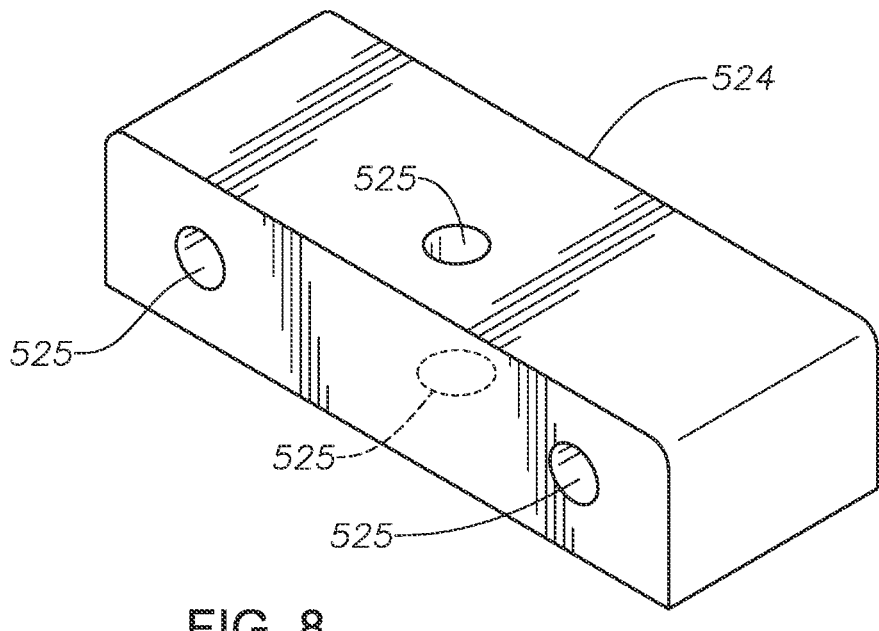
FIG. 8 is a perspective view of a bracket of the anti-rattle device shown in FIG. 3, in accordance with an embodiment.
Figure 9:
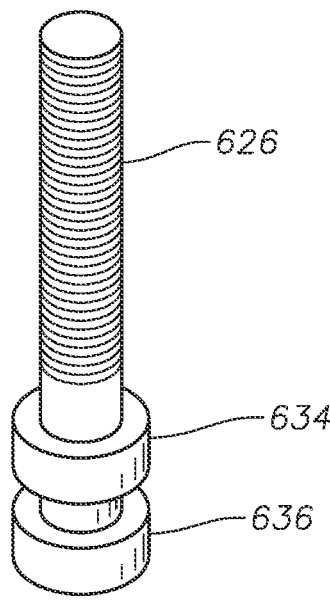
FIG. 9 is a perspective view of a threaded rod of the anti-rattle device shown in FIG. 3, in accordance with an embodiment.

FIGS. 3-9 illustrate an anti-rattle device, according to various embodiments of the subject application. In particular, FIG. 3 is a perspective view of an anti-rattle device, FIG. 4 is a side perspective view of the anti-rattle device shown in FIG. 3, and FIG. 5 is an exploded perspective view of the anti-rattle device shown in FIG. 3, in accordance with various embodiments. FIG. 6 is a perspective view of a handle assembly of the anti-rattle device shown in FIG. 3, and FIG. 7 is a side perspective view of the handle assembly shown in FIG. 6, in accordance with various embodiments. FIG. 8 is a perspective view of a bracket of the anti-rattle device shown in FIG. 3, and FIG. 9 is a perspective view of a threaded rod of the anti-rattle device shown in FIG. 3, in accordance with various embodiments.

In accordance with an embodiment, as shown in FIG. 3, the anti-rattle device 100 includes a handle assembly 120 and a wedge assembly 140. In accordance with an embodiment, the anti-rattle device 100 includes a plurality of handle assemblies 120. In a preferred embodiment, the anti-rattle device 100 includes two handle assemblies 120 engaged with the wedge assembly 140 near distal ends of the wedge assembly 140. Each of the two handle assemblies 120 may be engaged with the wedge assembly 140, for example, approximately 1.5 inches from the distal end of the wedge assembly 140, though the exact position of two handle assemblies 120 may be adjusted to align with pre-drilled holes in the side of the pallet. FIG. 4 is a side perspective view of the anti-rattle device shown in FIG. 3, illustrating the engagement of each handle assembly 120 with the wedge assembly 140.

FIG. 5 is an exploded perspective view of the anti-rattle device shown in FIG. 3, in accordance with an embodiment. The anti-rattle device 200 includes the plurality of handle assemblies 220 and the wedge assembly 240. Each handle assembly includes an adjustable handle 222, a bracket 224, and a threaded rod 226.

According to an embodiment, the adjustable handle 222 may include a low-profile adjustable handle with a threaded hole to receive the threaded rod 226. In operation, the adjustable handle 222 provides efficient screwing of the threaded rod 226 where vertical space is limited. Similar to conventional adjustable handles, the adjustable handle 222 includes a lever and a threaded serration (not shown). The threaded serration is contained within the housing of the adjustable handle 222. Because the lever and the threaded serration are engaged, a rotation of the lever of the adjustable handle 222 causes the threaded rod 226 to rotate simultaneously. According to an embodiment, a clockwise rotation of the lever of the adjustable handle 222 of approximately 180 degrees, or less, causes the threaded rod 226 to move in a downward direction. Next, the lever of the adjustable handle 222 is pulled up, which releases the threaded serration engagement with the lever. In the pulled-up position, the lever of the adjustable handle 222 is then rotated in a counter-clockwise direction of approximately 180 degrees, or less, corresponding to the clockwise rotation. Once the lever of the adjustable handle 222 returns to its initial rotational position, the lever is pushed down to a seated position, thereby causing the lever and the threaded serration to re-engage. According to another embodiment, the adjustable handle 222 may be a clamping lever, in which a spring is contained within the housing of the adjustable handle 222. In the case of the clamping lever, when the lever of the adjustable handle 222 returns to its initial rotational position, the lever is released and automatically returns to a seated position, thereby causing the lever and the threaded serration to re-engage due to the built-in force of the spring.

As the adjustable handle 222 is actuated, the threaded rod 226 moves the wedge assembly 240 in a downward direction to engage the rails of the cargo handling system of the aircraft. According to an embodiment, each of the handle assemblies 220 is actuated to create tension and frictional force between the pallet and the cargo handling system to further secure the pallet in place, thereby minimizing "slack" or "play" which may be caused by "jolting" or movement of the pallet system.

According to an embodiment, the bracket 224, as further shown in FIG. 5, includes a plurality of apertures configured to receive the threaded rod 226 and a plurality of bolts 228 to secure the anti-rattle device 200 to the pallet. According to an embodiment, the bracket 224 includes two apertures for receiving two bolts 228. These apertures are positioned to align with pre-drilled holes in the pallet. A plurality of floating nutplates, in particular, a pair of floating nutplates 230 are positioned on the inside face of the pallet to engage with the two bolts 228 for securing the anti-rattle device 200 to the pallet. According to an embodiment, the two nutplates 230 are secured to the pallet and the bracket 224 using a conventional securing means, such as rivets. According to an embodiment, each of the bolts 228 may have a thread size of ¼"-28 and may be a NAS6204-22 type bolt.

According to an embodiment, the threaded rod 226, as further shown in FIG. 5, is configured to engage the adjustable handle 222 through the aperture in the bracket 224.

FIG. 6 is a perspective view of a handle assembly of the anti-rattle device shown in FIG. 3, in accordance with an embodiment. The handle assembly 320 is shown in an assembled configuration, including adjustable handle 322, bracket 324, threaded rod 326 engaged with the adjustable handle 322, the two bolts 328 attached with the two floating nutplates 330 to secure the handle assembly 320, and thus the anti-rattle device, to the pallet.

FIG. 7 is a side perspective view of the handle assembly shown in FIG. 6, in accordance with an embodiment. The handle assembly 420 is shown in an assembled configuration, including adjustable handle 422, bracket 424, threaded rod 426 engaged with the adjustable handle 422, the two bolts 428 attached with the two floating nutplates 430 to secure the handle assembly 420, and thus the anti-rattle device, to the pallet. FIG. 7 further shows a slotted spring pin 432 arranged in an aperture of the adjustable handle 422 to further engage and secure the adjustable handle 422 to the threaded rod 426. FIG. 7 further shows a bushing 434 and a head 436 of the threaded rod 426, which will be described in more detail with respect to FIG. 9.

FIG. 8 is a perspective view of a bracket of the anti-rattle device shown in FIG. 3, in accordance with an embodiment. FIG. 8 shows bracket 524, which secures the anti-rattle device to the pallet, as discussed in detail above. Bracket 524 includes the plurality of apertures 525, which are positioned to align with pre-drilled holes in the pallet. According to an embodiment, each aperture is positioned in a side face of the bracket 524 approximately 0.5 inches from the distal end of the bracket 524. According to a preferred embodiment, the bracket may be made of stainless steel 304, for example, AISI 316 ANL, and may have the dimensions: 3.00 inches× 1.13 inches×0.75 inches, although other dimensions have been contemplated by the inventors for each bracket for securing the anti-rattle device to the pallet.

FIG. 9 is a perspective view of a threaded rod of the anti-rattle device shown in FIG. 3, in accordance with an embodiment. FIG. 9 shows the threaded rod 626, including the bushing 634 and the head 636. According to an embodiment, the threaded rod 626 is a 5/16 (0.3125) inch screw having NPT or BSP threads chosen to enable engagement between the threaded rod 626 and the handle assembly. According to an embodiment, the length of the threaded rod 626 is approximately 2.50-3.00 inches. The bushing 634 and the head 636 are spaced apart approximately 0.125 inches, i.e., the thickness of the frame, such that the spacing enables the head 636 to slide in a recess in the rubber wedge below the frame and the bushing 634 to slide above the frame in a position which provides surface contact for the bushing 634 to push down on the frame of the wedge assembly, when the handle assembly is actuated to move the threaded rod 626 in a downward direction, and to pull up on the frame of the wedge assembly, when the handle assembly is actuated to move the threaded rod 626 in an upward direction.

Figure 10:
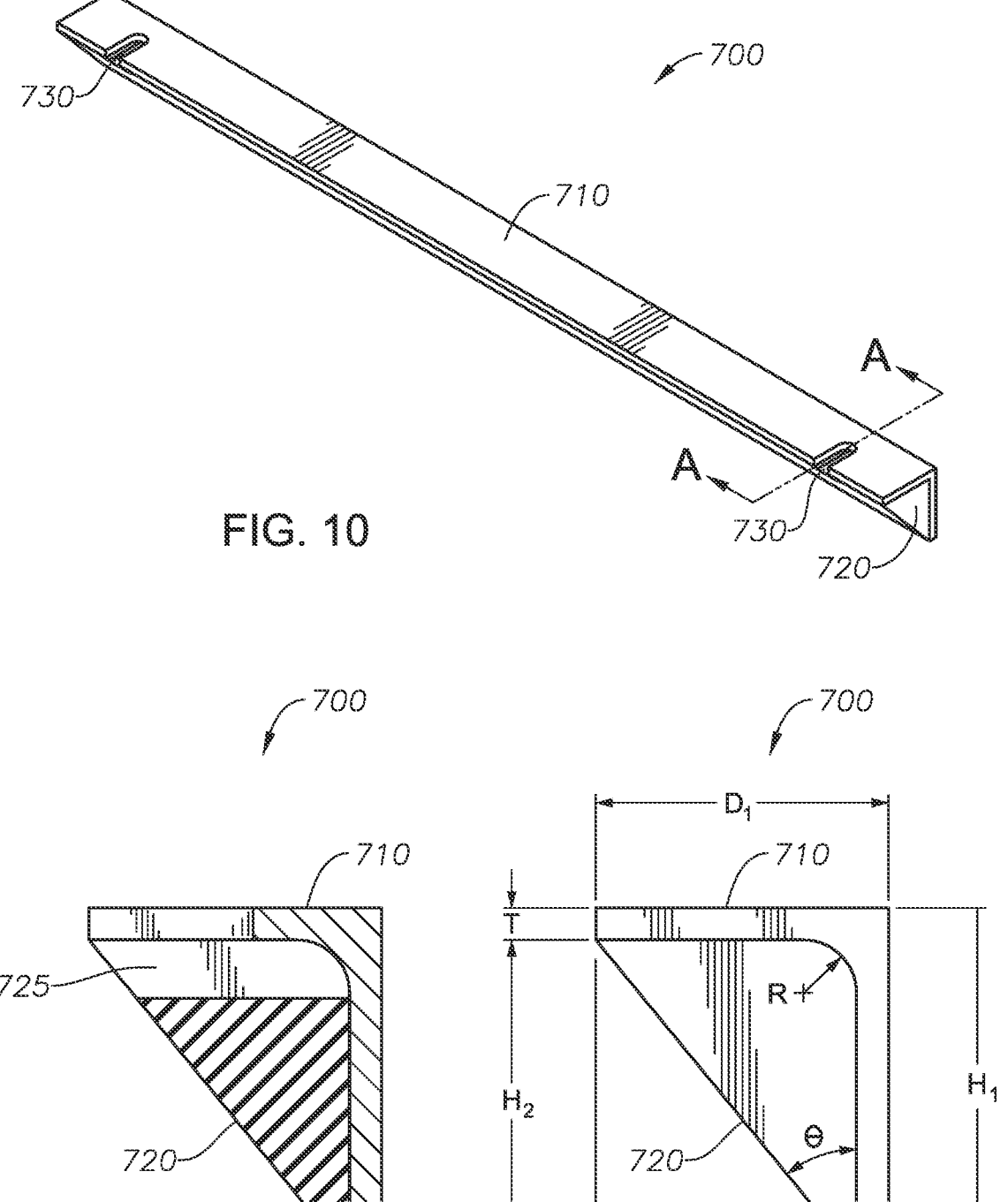
FIG. 10 is a perspective view of a wedge assembly of the anti-rattle pallet shown in FIG. 3, in accordance with an embodiment.
Figure 12:
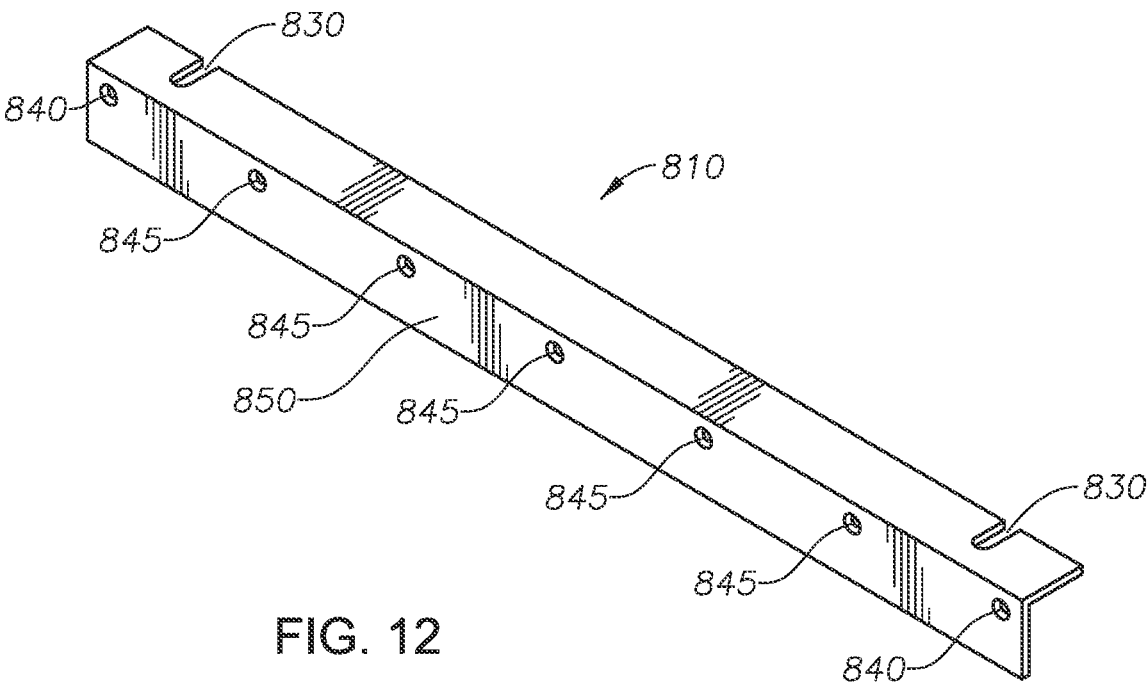
FIG. 12 is a perspective view of a frame of the wedge assembly shown in FIG. 10, in accordance with an embodiment.
Figure 13:
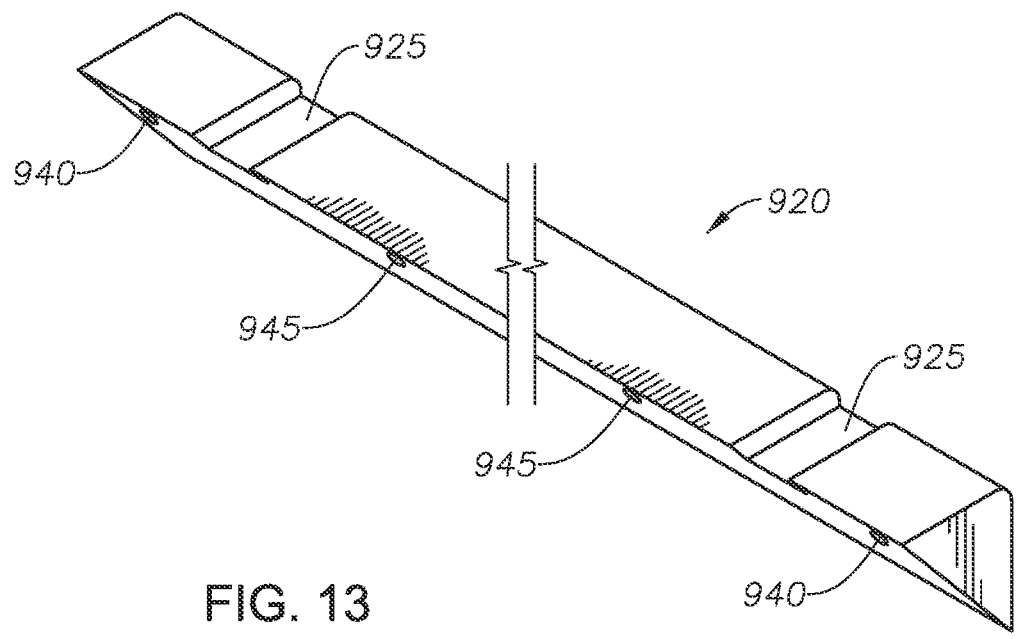
FIG. 13. is a perspective view of a rubber wedge of the wedge assembly shown in FIG. 10, in accordance with an embodiment.
Figure 14:
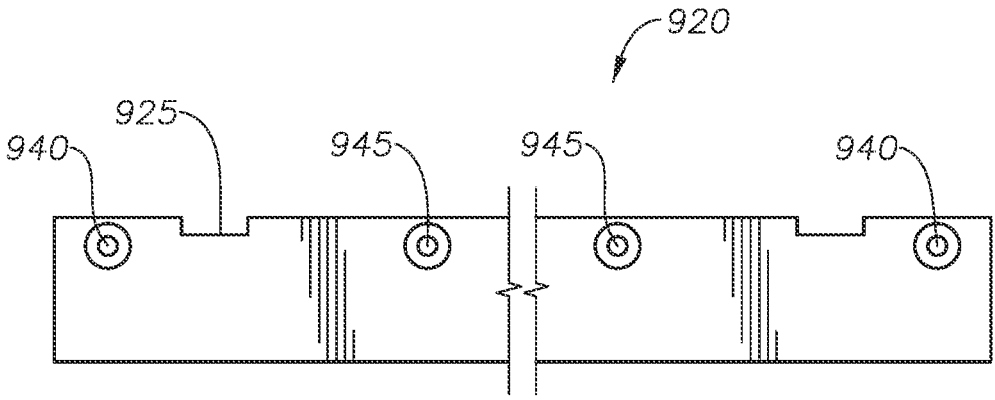
FIG. 14 is a front view of the rubber wedge of the wedge assembly shown in FIG. 13, in accordance with an embodiment.

FIGS. 10, 11A, 11B, and 12-14 further illustrate an anti-rattle device, according to various embodiments of the subject application. In particular, FIG. 10 is a perspective view of a wedge assembly of the anti-rattle device shown in FIG. 3, FIG. 11A is a cross sectional view taken along A-A of the wedge assembly of the anti-rattle device shown in FIG. 10, and FIG. 11B is a side perspective view of the wedge assembly of the anti-rattle device shown in FIG. 10, in accordance with various embodiments. FIG. 12 is a perspective view of a frame of the wedge assembly shown in FIG. 10, in accordance with various embodiments. FIG. 13. is a perspective view of a rubber wedge of the wedge assembly shown in FIG. 10, and FIG. 14 is a front view of the rubber wedge of the wedge assembly shown in FIG. 13, in accordance with various embodiments.

In accordance with an embodiment, as shown in FIG. 10, the wedge assembly 700 includes a frame 710 and a rubber wedge 720. The rubber wedge 720 is nested in the inner surface of the frame 710. Both the frame 710 and the rubber wedge 720 have a plurality of recesses 730 configured to receive the threaded rod of each of the hand assemblies.

FIG. 11A is a cross sectional view taken along A-A of the wedge assembly of the anti-rattle device shown in FIG. 10, in accordance with an embodiment. FIG. 11B is a side perspective view of the wedge assembly of the anti-rattle device shown in FIG. 10, in accordance with an embodiment. FIGS. 11A and 11B further show the wedge assembly 700, the frame 710, a rubber wedge 720. According to an embodiment, the depth $D_1$ and the height $H_1$ of the frame are approximately the same. In a preferred embodiment, the depth $D_1$ is less than the height $H_1$ of the frame. For example, the depth $D_1$ of the frame is 1.25 inches and the height $H_1$ of the frame is 1.50 inches. The thickness of the frame is approximately 0.125 inches. According to an embodiment, the frame is made of stainless steel 304, for example, AISI 316 ANL.

According to an embodiment, the rubber wedge 720 is nested in the frame 710. According to an embodiment, the depth $D_2$ and the height $H_2$ of the frame are approximately the same. In a preferred embodiment, the depth $D_2$ is less than the height $H_2$ of the frame. For example, the depth $D_2$ of the frame is 1.13 inches and the height $H_2$ of the frame is 1.38 inches. According to an embodiment, the rubber wedge 720 is made of neoprene rubber. The rubber wedge 720 may be a 75 Durometer rubber wedge capable of securing a pallet load of at least 4,000 lbs. According to an embodiment, the rubber wedge has an interior angle $\Theta$ of 45 degrees, more preferably, an interior angle $\Theta$ of 39.3 degrees and an inner radius R of R.25.

FIG. 12 is a perspective view of a frame of the wedge assembly shown in FIG. 10, in accordance with an embodiment. FIG. 12 shows the frame 810 according to various embodiments. The frame 810 includes recesses 830 configured to receive the threaded rod of each of the hand assemblies. Each of the recesses 830 has an approximate width of 0.30-0.35 inches and an approximate depth of 0.70-0.75 inches. A radius of curvature in each recess is R.17. According to an embodiment, each of the recesses 830 is positioned approximately 1.50 inches from the distal ends of the frame 810. According to an embodiment, the frame 810 further includes a plurality of apertures 840, 845 configured to receive screws to secure the frame to the rubber wedge of the anti-rattle pallet device. According to an embodiment, outer apertures 840 are positioned approximately 0.50 inches from the distal ends of the frame 810 and inner apertures 845 are positioned every approximately 3.00-3.25 inches from one another. The plurality of apertures 840, 845 are sized to receive #8 flat head screws.

According to an embodiment, the length of the frame 810 is approximately 20.00 inches, although other lengths of the frame 810 are contemplated by the inventors based on the dimensions of the pallet and required cargo loads to be carried by the pallet. According to an embodiment, each pallet includes a plurality of anti-rattle devices. In a preferred embodiment, each pallet includes a pair of anti-rattle devices on each lateral side, such that a contact length of rubber on the rails of the cargo handling system is approximately 80.00 inches.

According to an embodiment, the frame 810 further includes an anti-chafe tape 850, for example, a Teflon anti-chafe tape, on the outer surface of the frame 810 facing the pallet to prevent scratching of the pallet by the wedge assembly, when moving the wedge assembly in a downward direction to engage and in an upward direction to disengage the anti-rattle pallet restraint device against the rails of the cargo handling system.

FIG. 13. is a perspective view of a rubber wedge of the wedge assembly shown in FIG. and FIG. 14 is a front view of the rubber wedge of the wedge assembly shown in FIG. 13, in accordance with various embodiments. As shown in FIGS. 13 and 14, the rubber wedge 920 of the anti-rattle device includes a pair of notches 925 configured to align with the recesses in the frame of the anti-rattle device. According to an embodiment, the pair of notches 925 have a depth, which allows the head of the threaded rod to slidingly engage the recess between the top surface of notches 925 of the rubber wedge 920 and the bottom surface of the frame of the wedge assembly, and allows the bushing of the threaded rod to slidingly engage the top surface of the frame of the wedge assembly. According to an embodiment, the notches 925 have a depth of approximately inches. According to an embodiment, the rubber wedge 920 further includes a plurality of apertures 940, 945 configured to secure the frame to the rubber wedge of the anti-rattle device. The plurality of apertures 940, 945 are sized to receive #8 flat head screws.

Figure 15A:
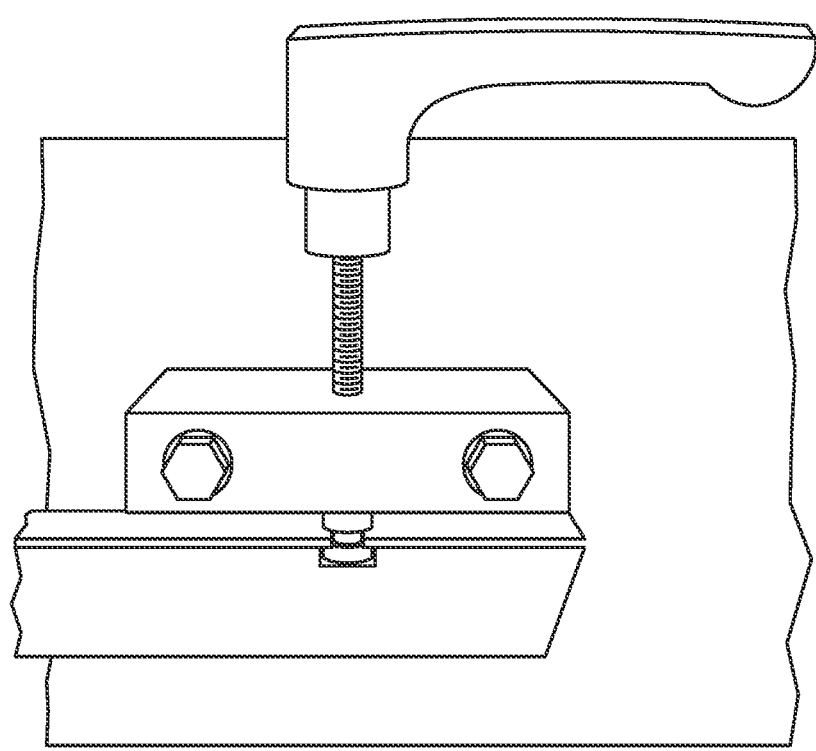
FIGS. 15A and 15B are perspective views of an anti-rattle device in a non-engaged orientation, in accordance with an embodiment.
Figure 16:
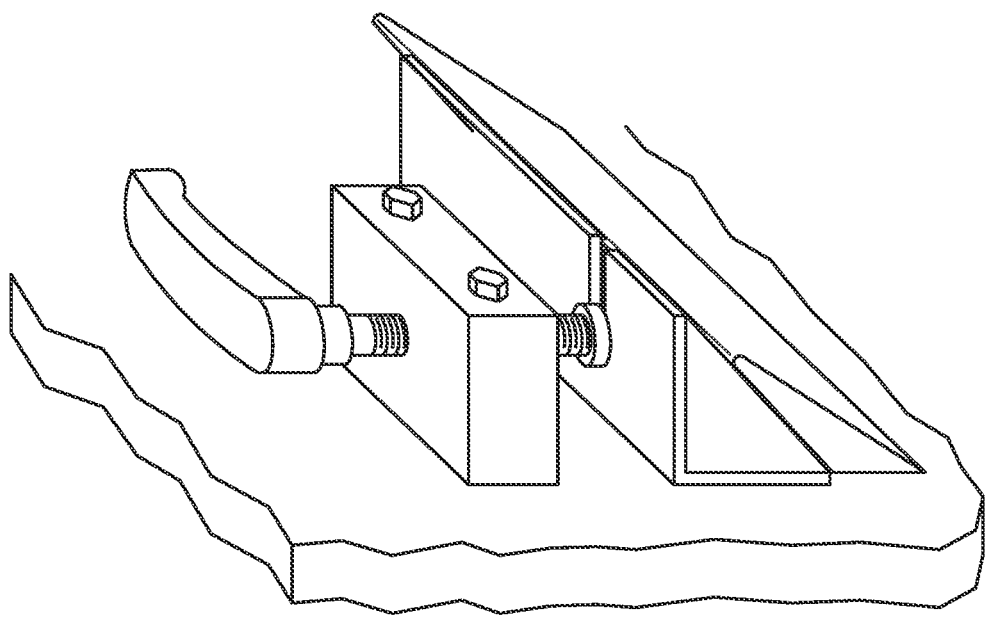
FIG. 16 is a perspective view of an anti-rattle device in an engaged orientation, in accordance with an embodiment.
Figure 17:
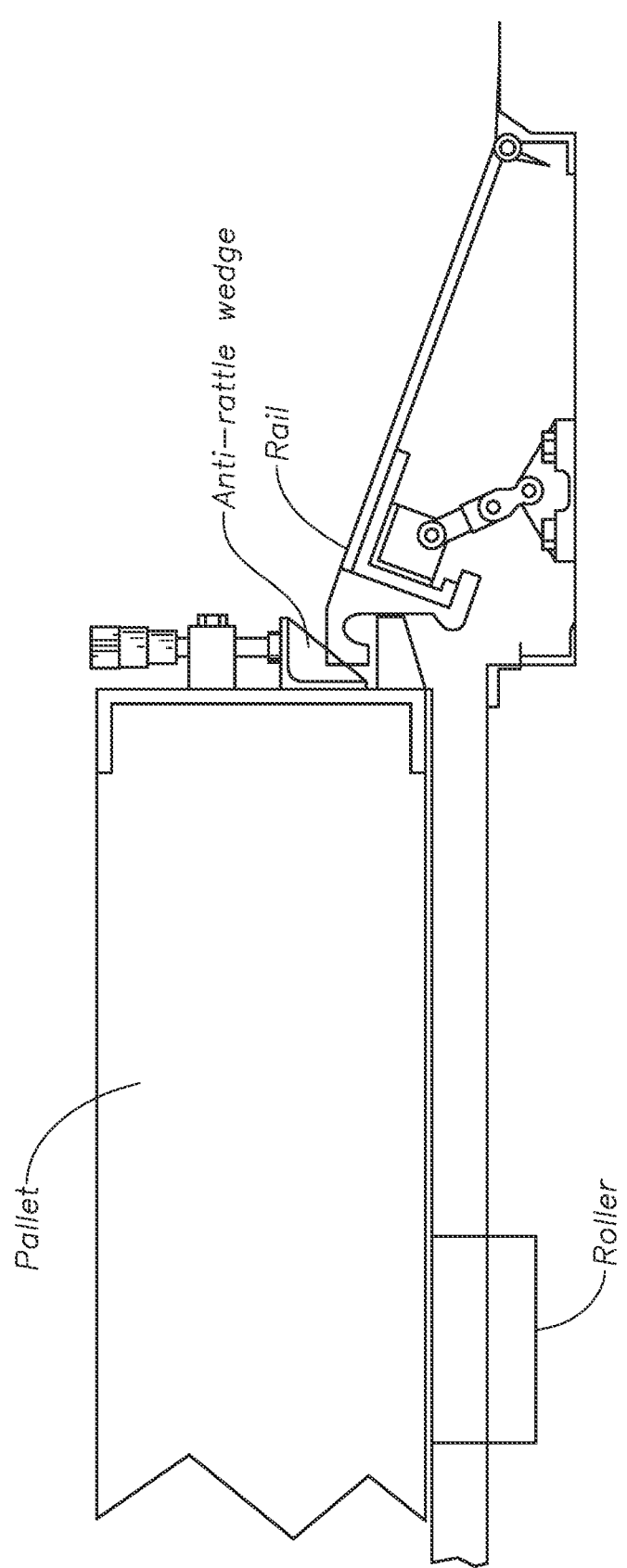
FIG. 17 is a side perspective view of an anti-rattle device engaged with the rails of a cargo handling system, in accordance with an embodiment.

FIGS. 15A, 15B, 16, and 17 illustrate various views of an anti-rattle device in a non-engaged orientation and engaged orientations, in accordance with various embodiments. In particular, FIGS. 15A and 15B perspective views of an anti-rattle device in a non-engaged orientation, FIG. 16 is a perspective view of an anti-rattle device in an engaged pos orientation ition, and FIG. 17 is a side perspective view of an anti-rattle device engaged with the rails of a cargo handling system, in accordance with various embodiments. A method for securing a pallet to a cargo handling system, in accordance with embodiments, using the anti-rattle device, as shown in FIGS. 1-14, will be described in detail below with reference to FIGS. 15A, 15B, 16, and 17.

Figure 15B:
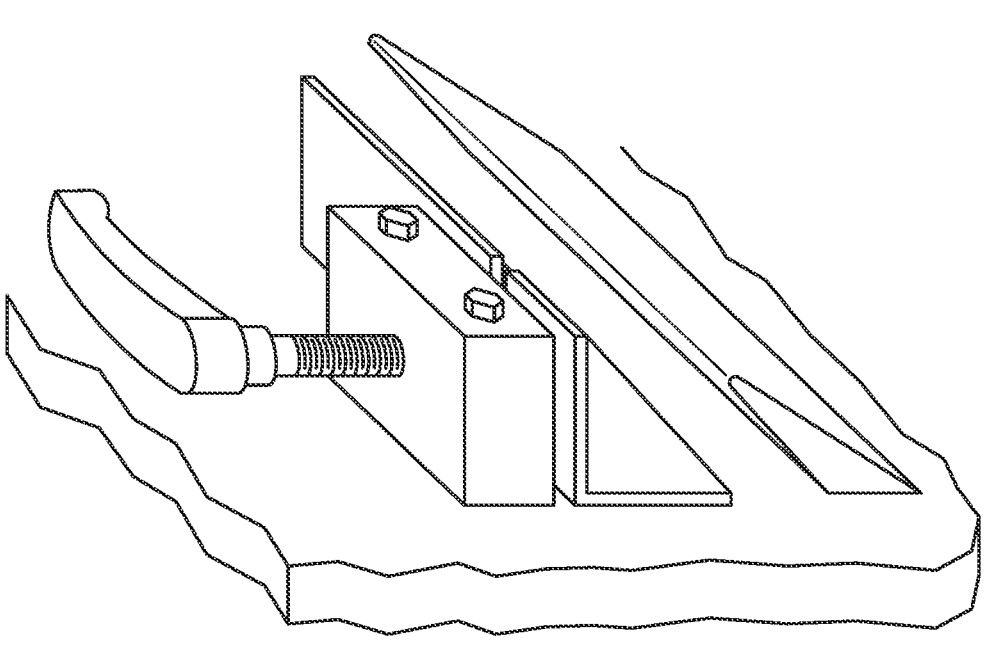

FIGS. 15A and 15B are perspective views of an anti-rattle device in a non-engaged orientation, in accordance with an embodiment. As shown in FIGS. 15A and 15B, an anti-rattle device in a non-engaged orientation has the wedge assembly positioned in an upward position adjacent to the bracket of the anti-rattle device. In the non-engaged orientation, the handle assembly has been actuated, such that the threaded rod has been moved in an upward direction pulling the wedge assembly away from the rails of the cargo handling system, such that a distal end of the threaded rod is screwed up into the adjustable handle. In the non-engaged orientation, the bracket is spaced apart from the wedge assembly by a distance approximately equivalent to the thickness of the bushing of the threaded rod.

FIG. 16 is a perspective view of an anti-rattle device in an engaged orientation, in accordance with an embodiment. As shown in FIG. 16, an anti-rattle device in an engaged orientation has the wedge assembly positioned in a downward position in contact with the rails of the cargo handling system. In the engaged orientation, the handle assembly has been actuated, such that the threaded rod has been moved in a downward direction pushing the wedge assembly towards the rails of the cargo handling system. In the engaged orientation, the rubber wedge of the wedge assembly is exerting a frictional force on the rails of the cargo handling system to further secure the pallet in place. According to an embodiment, the frictional force exerted by a plurality of anti-rattle devices on the rails of the cargo handling system would secure a pallet load of at least 4,000 lbs or resist forward or aft load factors of at least 1G. In this case, four (4) anti-rattle devices would be deployed on the lateral sides of the pallet, providing a contact length of rubber on the rails of the cargo handling system of approximately 80.00 inches.

FIG. 17 is a side perspective view of an anti-rattle device engaged with the rails of a cargo handling system, in accordance with an embodiment. As shown in FIG. 17, an anti-rattle device is deployed on the lateral side of the pallet and configured to engage a rail of a cargo handling system after the pallet is rolled into an aircraft on rollers and aligned in place between rails of a cargo handling system.

According to an embodiment, there is provided a method for securing a pallet to a cargo handling system. The method includes aligning a pallet between rails of a cargo handling system and actuating an anti-rattle device to secure the pallet against the rails of the cargo handling system. The anti-rattle device includes a plurality of handle bracket assemblies and a wedge assembly. Each of the handle bracket assemblies includes an adjustable handle, a bracket, and a threaded rod. The wedge assembly includes a frame and a rubber wedge. Each of the handle bracket assemblies is secured to the pallet. According to an embodiment, the step of actuating the anti-rattle device includes rotating the adjustable handle of each of the handle bracket assemblies to move the wedge assembly in a downward direction to engage the rails of the cargo handling system, such that the engagement of the wedge assembly against the rails creates tension and frictional force between the pallet and the cargo handling system to further secure the pallet in place.

We claim:

1. An anti-rattle device, comprising:
a plurality of handle bracket assemblies, each of the handle bracket assemblies comprising: an adjustable handle, a bracket, and a threaded rod; and
a wedge assembly, comprising: a frame and a rubber wedge,
wherein each of the handle bracket assemblies is secured to a pallet,
wherein the adjustable handle of each of the handle bracket assemblies is configured to actuate to move the wedge assembly in a downward direction to engage a rail of a cargo handling system, such that the engagement of the wedge assembly against the rail creates tension and frictional force between the pallet and the cargo handling system to further secure the pallet in place.

2. The anti-rattle device of claim 1, wherein the plurality of handle bracket assemblies is two handle bracket assemblies.

3. The anti-rattle device of claim 1, wherein the adjustable handle comprises a threaded hole configured to receive the threaded rod.

4. The anti-rattle device of claim 1, wherein the adjustable handle is configured to actuate the threaded rod in an upward direction to move the wedge assembly in a non-engaged orientation adjacent to the bracket and in a downward direction to move the wedge assembly in an engaged orientation to engage the rail of a cargo handling system.

5. The anti-rattle device of claim 1, wherein the bracket comprises a plurality of apertures, two of which are configured to secure the bracket to a lateral side of the pallet, the two apertures being aligned with pre-drilled holes in the pallet.

6. The anti-rattle device of claim 1, wherein the threaded rod comprises a head and a bushing, both of which are configured to engage the wedge assembly.

7. The anti-rattle device of claim 6, wherein the head of the threaded rod is configured to slidingly engage a recess in the rubber wedge of the wedge assembly and an inside surface of the frame of the wedge assembly.

8. The anti-rattle device of claim 6, wherein the bushing of the threaded rod is configured to slidingly engage an outside surface of the frame of the wedge assembly.

9. The anti-rattle device of claim 1, wherein the rubber wedge is nested in an inner surface of the frame of the wedge assembly.

10. The anti-rattle device of claim 1, wherein the rubber wedge is a 75 Durometer rubber wedge capable of securing a pallet load of at least 4,000 lbs or resisting forward or aft load factors of at least 1G on the pallet, when the wedge assembly is engaged with the rail of the cargo handling system.

11. The anti-rattle device of claim 1, wherein the frame and the rubber wedge each comprises a plurality of apertures to receive screws to secure the frame and the rubber wedge to one another.

12. The anti-rattle device of claim 1, further comprising:
a tape on an outer surface of the frame of the wedge assembly, wherein the tape is configured to prevent scratching of the pallet by the wedge assembly, when moving the wedge assembly in a downward direction to engage and in an upward direction to disengage the anti-rattle pallet restraint device against the rails of the cargo handling system.

13. The anti-rattle device of claim 1, wherein the rubber wedge comprises a pair of notches, each notch configured to receive the head of the threaded rod for each handle bracket assembly.

14. A pallet oriented on an aircraft, the pallet comprising:
a pair of anti-rattle devices arranged on each lateral side of the pallet,
wherein each anti-rattle device comprises:
a plurality of handle bracket assemblies, each of the handle bracket assemblies comprising: an adjustable handle, a bracket, and a threaded rod; and
a wedge assembly, comprising: a frame and a rubber wedge,
wherein each of the handle bracket assemblies is secured to the pallet,
wherein the adjustable handle of each of the handle bracket assemblies is configured to actuate to move the wedge assembly in a downward direction to engage rails of a cargo handling system, such that the engagement creates tension and frictional force between the pallet and the cargo handling system to further secure the pallet in place.

15. The system of claim 14, wherein a cumulative length of the rubber wedges engaged with the rails of the cargo handling system is 80.00 inches.

16. The system of claim 15, wherein each of the rubber wedges is a 75 Durometer rubber wedge, the cumulative length of the engaged rubber wedges being capable of securing a pallet load of at least 4,000 lbs or resisting forward or aft load factors of at least 1G on the pallet.

17. A method for securing a pallet to a cargo handling system, comprising:
aligning a pallet between rails of a cargo handling system;
actuating an anti-rattle device to secure the pallet against the rails of the cargo handling system,
wherein the anti-rattle device comprises:
a plurality of handle bracket assemblies, each of the handle bracket assemblies comprising: an adjustable handle, a bracket, and a threaded rod; and
a wedge assembly, comprising: a frame and a rubber wedge,
wherein each of the handle bracket assemblies is secured to a pallet, and
wherein actuating the anti-rattle device comprises rotating the adjustable handle of each of the handle bracket assemblies to move the wedge assembly in a downward direction to engage the rails of the cargo handling system, such that the engagement of the wedge assembly against the rails creates tension and frictional force between the pallet and the cargo handling system to further secure the pallet in place.

* * * * *